United States Patent Office 3,719,499
Patented Mar. 6, 1973

3,719,499
MEAT ANALOGS
Atta Mohammed Hai, Palisades Park, and Charles M. Kerrigan, Wayne, N.J., and Harold T. Leidy, New City, N.Y., assignors to General Foods Corporation, White Plains, N.Y.
No Drawing. Filed Dec. 29, 1970, Ser. No. 102,548
Int. Cl. A23l 1/20
U.S. Cl. 99—17                               5 Claims

ABSTRACT OF THE DISCLOSURE

Meat analogs are formed from a vegetable protein concentrate that has incorporated a frozen vegetable oil and/or frozen rendered animal fat prior to a heating operation which causes gelation of the vegetable protein.

BACKGROUND OF THE INVENTION

The present invention is directed to the formation of a vegetable protein gel which is formulated to resemble a meat product. The present invention may be processed to resemble naturally-occurring meat cuts as well as processed meat materials, for example, sausage type products.

In recent years, an extensive development has been undertaken in the use of vegetable materials to substitute for a meat product. Since meat contains a high quantity of protein, concentrated sources of vegetable protein have been reformulated to substitute for the meat product. Through appropriate processing steps and with different formulations, vegetable protein may be substituted for the proteinaceous, meaty material.

A technique of producing fibrous vegetable protein is by the preparation of a viscous protein solution which is extruded through spinnerets into an acid-coagulating bath which causes precipitation into a filament form. These filaments are assembled into a meat-like product by the incorporation of binding materials. Boyer, U.S. Pat. No. 2,682,466 patented June 29, 1954 is considered the forerunner in this technique. However, since that time numerous patents have been issued in use of cogulating techniques employing spinnerets including Westeen et al., U.S. Pat. No. 3, 118,959 issued in 1964; Kuramoto et al., U.S. Pat. No. 3,177,079 issued in 1965; Dechaine, U.S. Pat. No. 3,269,841 issued in 1966; Page et al., U.S. Pat. No. 3,403,027 and Boyer et al., U.S. Pat. No. 3,468,669 issued in 1969.

Another series of patents have been issued in the formation of a "chewy protein gel" by using various techniques to form meat-like products. The patentees, Anson and Pader, holders of U.S. patents including U.S. Pat. Nos. 2,802,737; 2,813,024; 2,813,025; 2,830,902 and 2,833,651 have taught adjusting a gel precursor such as soy or peanut concentrates to a pH of about 6.0 which is followed by heating to convert to a "chewy protein gell." Various additives including filaments, doughs, flavoring ingredients, etc., may be incorporated into the synthetic meat products.

Numerous other patents have been issued in the specific technique of forming various components into the system that represents a meat product. For example, Kjelson, U.S. Pat. No. 3,343,966 patented Sept. 26, 1967 discloses high protein food products resembling chopped ground meats. A source of spun edible protein fibers is bound together with a binder consisting of albumen, gluten and particulate oilseed material. The composition is heat set to form the simulated meat product. Also, Hartmen, U.S. Pat. No. 3,320,070 patented May 16, 1967 teaches the manufacture of a product that is said to resemble bacon. The product formed from natural vegetable protein fibers which have been processed for incorporating a binder included albumen with an edible proteinate. The product has lean and nonlean portions so as to resemble the real meat product.

SUMMARY OF THE INVENTION

The present invention is directed to the formation of meat products by use of proteinaceous vegetable material concentrates. The primary meat-containing food that is resembled with the use of the present invention are sausage foods which are made from a meat-containing emulsion that is heat cured to a stable, physical form. Foods such as bologna, olive loaf, frankfurters, etc., would be essentially duplicated by the analogs of this invention. However, the invention is broader in scope since meat products, in general, can be duplicated from taste considerations utilizing the disclosure of this invention.

The required constituent in the manufacture of the disclosed food is a concentrated source of vegetable protein that possesses the quality that may be heat set into a gel system in the presence of water. The gel system is formed merely by the application of heat. In the formation of a meat analog system, various additives are incorporated into the gel precursor prior to the heat set operation. It has been discovered that the final gelled product has a tendency to be unduly dry from organoleptic evaluation which is undesirable in a wide variety of meat products. For example, in a sausage analog juiciness qualities are highly desirable since moistness is present in high quality meat systems.

The present invention employs the concept that discrete particles of vegetable oil or rendered animal fat should be present in the final system. If the fat is merely added to the gel precursor, the total matrix appears to tie the fat as well as the water tightly into the total system. When the product is consumed, the apparent emulsification of the fat results in a dry, lower quality product. The present disclosure utilized the vegetable oil or rendered animal fat in a frozen form at the time it is added to the vegetable protein concentrate. During the mixing step, the frozen quality of the vegetable oil or animal fat prevents the step of apparent emulsification. Additionally, the result is obtained that an increase of juiciness is realized when the final meat analog is heated and prepared for serving as in the case of a frankfurter.

In the production of the gel material of the present invention, other gel materials may be utilized in addition to the vegetable proteinaceous material. These gel precursors are albumen, casein and whey, and the gel system produced by the combination of these materials is considered superior for consumer considerations for some types of meat analogs.

The present meat analogs may have various additives blended into the gel precursor prior to the heat set operation. Illustrative of suitable ingredients are flavors, starches, emulsifiers, coloring materials, gums and other proteinaceous materials such as gelatin which serves to complete and balance the analog.

DETAILED DESCRIPTION OF THE INVENTION

As employed herein, a meat analog is used in its normal definition in that the formed product resembles a meat product yet is entirely distinct in its source materials. Meat products with filler components lie outside the scope of analog since the filler is employed only as an extruder without forming a distinctly new product. In contrast, the vegetable proteinaceous material is formulated to resemble the meat source in essential charcteristics.

An analog resembling natural meat cuts may be considered to be a system with a substantial amount of fibers bound together in a matrix. Examples of duplicated meats are steak, pork chops, etc.

In contrast, a sausage or sausage analog is not considered to resemble natural meat cuts. A sausage, or in this disclosure a sausage analog, is formulated and processed so as to duplicate as closely as possible meat products that are initially formed into an emulsion system. The meat emlulsion is heated which results in gelation introducing a degree of rigidity. The initial meat emulsion with the water component has flow characteristics so that it may be readily shaped, as in a casing, prior to the gelation to a stable, physical form. Examples of meat sausages are bologna, olive loaf, frankfurters, etc.

A vegetable proteinaceous gel material of the analog may serve as a binding system in natural meat cut analogs and be dispersed in non-uniform quantities throughout employed fibers. The vegetable gel may be present with a degree of uniformity throughout the food as in sausage analog, and the vegetable gel precursor may be considered to be the analog counterpart of the meat emulsion.

Problems have arisen in the formulation of the gel precursor since after the heat set operation dryness of this constituent has arisen. This dryness quality, or in other words lack of juiciness, has limited the flexibility of the gel since, for example, adding more water or fat prior to gelation does not directly solve the problem. Additionally, it has been found that the introduction of the fat or oil may be critical since it is mixed in a fashion to obtain a degree of uniformity or mixed to be present as discrete layers or pockets.

Due to the dryness problem, particularly in a sausage analog, a ready water release with the rendered fat or oil has not been satisfactory.

It has been theorized, although not with complete certainty, that the proteinaceous vegetable gel precursor acts as an emulsifier and ties the fat or oil together with the added water into the matrix. Therefore, after gelation by heating the prior emulsification prevents the ready release of the water with fat from the gelled matrix.

The present invention overcomes the apparent emulsification of the fat rendered or vegetable oil in the binding of substantial water levels by freezing of the added fat prior to the mixing with the vegetable protein concentrate. This mixing of the frozen product together with the vegetable protein inhibits to a significant extent any emulsification, even though the fat or oil may be completely thawed prior to the gelation operation. The fat can be present in discrete particles throughout the gel, although a degree of uniformity will be obtained.

The distribution of fat or oil present in the final gel product may be controlled by the particle size of the frozen fat or act at the time of introduction into the vegetable protein gel precursor. If small pockets of fat are desired, fine grinding of the frozen material will take place. If layers of fat, as in bacon or a steak-type product are desired, relatively large blocks of the frozen oil or rendered fat will be mixed into the gel precursor.

The vegetable proteinaceous material employed in the present invention is defined to have the characteristic and quality that upon heating in a water carrier, gelation to a stable, physical form occurs. As in typical gel systems, a degree of rigidity is introduced which is coupled with elasticity and resilience. Ordinarily, the protein content, based on the weight of the protein vegetable material, will be above about 30% and more, desirably 60%, which is based on the solids content. No upper limit on the maximum protein content exists, and protein concentrations about 95% by weight are satisfactory and desirable.

A gel as employed herein is employed in its normal definition, i.e. solid or semi-solid system in colloidal dimensions in a carrier liquid which is preferably water. The sources of vegetable protein in the gel may be derived from a wide variety of vegetable material, as for example, defatted oilseeds, and may include soy, peanuts, cottonseed, peas, etc. The vegetable protein is in concentrated form and may be bland. In the case of soy, unwanted flavors are removed. Concentrated protein materials are readily available in commercial form such as isolates, concentrates and flours.

A necessary component is water, since in order for the gel to form this material must be present. The total water content in the product prior to gelation may vary since a large portion of the analog may comprise fibers or fillers. Additionally, the water content of the final product will be determined by the type of meat product that is to be duplicated by the analog system. For example, in the sausage analog a dry intermediate or wet sausage may be duplicated. In this latter class of products, water contents of 42 to 74% have been found acceptable with an optimum range of 52 to 65% by weight. However, these percentage figures are not considered to be limiting since the amount of mixture in the product is considered to be governed by a wide variety of variables dictated in part by consumer acceptance of the specific analog.

A necessary component in the present formulation is the use of a vegetable oil or rendered animal fatty tissue. The types of vegetable oil are varied and may be hydrogenated or unhydrogenated, including soybean, corn, coconut, etc., and are of the type well known. The animal fatty tissue that is employed is rendered which means the original cell structure originally present in the tissue has been destroyed.

In the formation of the gel constituent, satisfactory results occur when the primary gel component is derived from the vegetable protein material. However, with a sausage analog superior results have been found to take place when at least an additional non-vegetable source of protein is employed which also gels upon heating. These sources of protein are albumen, casein and whey or combinations thereof, and yield a product that is considered to be a high quality gel system. In duplicating a sausage, the concentrations by weights of the gelable constituents, namely the vegetable protein material in conjunction with the albumen, casein, whey and combinations are critical if the final product is to possess a superior gel system. Since the concentration of vegetable material may vary dependent on the degree of refinement, the critical ratio of materials is given on the basis of the protein content of the vegetable material.

The minimum weight concentrations of vegetable protein to albumen, casein and whey would be of the order of about 3.4:1, 5:3 and 1:1, respectively. With combinations of albumen, casein and whey, the minimum concentration of vegetable materials is intended to encompass a weighted total of these added gel precursors. The maximum vegetable protein concentration to these added gel components will be of the order of about 40:1.

When using component combinations of vegetable proteinaceous material with the added albumen, casein and whey, it is desirable that uniformity of these components be obtained prior to the gelation conditions. Non-uniformity of gels may be obtained and an acceptable product can be realized, however, a superior gel system is considered to be obtained when uniformity in mixing is obtained. The conditions of gelation are obtained merely by heating which brings about the desired result. Elevated temperatures preferably in the range of 150° F. to about 300° F. will cause the gel to form. Minimum temperatures will cause longer gel times while excessive temperatures will cause gelation, but will additionally result in some protein degradation. Optimum gelation temperatures are considered to lie above the boiling point of water in autoclaving techniques wherein elevated pressure is satisfactorily employed. To complete the desired flavor characteristics and appearance of the meat analog, flavored spices and coloring components are highly desirable. These constituents may be mixed in either the gel precursor or they may be separately added to the final gel as well as the combination of both of these techniques.

To further illustrate the innovative aspects of this invention, the following examples are provided:

Example 1

To form a juicy, frankfurter-type analog, the following constituents were employed:

| | Percent |
|---|---|
| Soy isolate (30% solids) | 35.1 |
| Wheat gluten/soy grits/flour mixture (expanded filler with ammonium carbonate) (30% solids) | 26.7 |
| Water | 15.3 |
| Vegetable oil (Wecotop B) | 14.7 |
| Soybean oil | 1.7 |
| Albumen | 1.1 |
| Seasoning/flavor/color | 5.4 |

The expanded filler material is a high protein constituent containing wheat gluten/soy grits/flour. This expanded filler is made by mixing the source constituents with a water concentration of about 25%. Ammonium carbonate at a concentration of about 0.6% is employed since this material increases the expansion effect during the processing. The residual ammonium carbonate concentration will approach 0%. The constituents are fed into an inlet of a heated Model X-25 Wenger Extruder wherein the mix is subjected to elevated temperature and pressure by a revolving screw in the extruder barrel. The constituents are extruded through two ⅜-inch diameter dies with a recorded pressure of approximately 150 p.s.i.g. and a temperature of approximately 300° F. at the die face. The material is soaked in water and excess water is removed to give a final solids content of 30%. The material is comminuted prior to subsequent mixing with the component.

The soy isolate which has a pH of 6.2 and is at a concentration of 30% solids is blended with the soy grits/wheat gluten/flour as well as with water, albumen, seasoning flavor and color in a prefilled Hobart Silent Cutter below 40° F.). The quantity of water added at this stage of processing is sufficient to permit the ingredients to be blended uniformly and comminution.

The vegetable oil was liquified by heating to approximately 120° F., poured into a shallow pan and allowed to solidify at room temperature. After solidification, the oil was frozen at a minus 30°. The frozen oil was removed from the pan, cut into 3-inch by 3-inch by 2-inch blocks and placed in a pre-chilled (below 40° F.) Hobart VCM-40 Vertical Cutter Mixer and chopped for 45 seconds at 1750 r.p.m. The resultant frozen product was granular and free-flowing with an estimated particles size range of 0.005 to 0.27 inch in diameter with the main distribution of particle size towards the smaller end of the range.

The granular frozen oil was added to the Silent Cutter with a total mix with mixing for 5 minutes. The product was cased, linked and heat set in a pressure cooker at an elevated temperature at 10 p.s.i.g. for 10 minutes.

Example 2

The process of Example 1 was repeated, except in place of the vegetable oil rendered beef tallow was employed. The remaining process steps were identical as in the preceding example.

Examples 3 and 4

To serve as controls for the vegetable oil and rendered beef tallow that were applied in a frozen condition, Examples 1 and 2 were duplicated in all essential respects. However, the vegetable oil and rendered beef tallow were added to the other constituents in a non-frozen state without prior freezing. Organoleptic evalutions gave the result that use of the frozen materials in Examples 1 and 2 gave significant juiciness qualities than the respectively non-frozen samples of Examples 3 and 4. Further evidence of the survival of the granular oil and fat of Examples 1 and 2 was visually evident upon slicing of the heat set analog. Examples 3 and 4 did not show these granular fat or oil pockets being present. Additionally, upon warming of the analogs, Examples 1 and 2 produced a ready release of liquid from the matrix upon squeezing. In the warm analogs of Examples 3 and 4, squeezing produced a negligible and insignificant release of liquid.

From the foregoing description of specific embodiments of the present invention, numerous modifications and alterations will become readily apparent to those skilled in the art, and it is intended that such be included within the scope of the present invention.

What is claimed is:

1. A method of forming a food product which resembles meat products prepared from meat emulsions, comprising:
    (a) uniformly blending together
        (1) a gel precursor consisting of a vegetable protein and a material selected from the group consisting of albumen, casein, whey and mixtures thereof, said vegetable protein being present above about 30% by weight of the gel precursor and wherein the minimum weight ratio of the vegetable protein to albumen, casein and whey is in the range from about 3.4:1, 5:3 and 1:1, respectively, or a weighted total for mixtures thereof and wherein the maximum weight ratio of vegetable protein to albumen, casein, whey or combinations thereof is about 40:1,
        (2) a frozen material selected from the group consisting of rendered animal fat, vegetable oil or a mixture thereof in an amount ranging from about 5% to 30% by weight of the total blend,
        (3) water, in an amount ranging from about 42% to about 74% by weight of the total blend,
        (4) a filler material in the form of particles of an expanded high protein source mixture of wheat gluten, soya grits and flour, and
        (5) small but effective amounts of flavorings, spices and coloring components to impart to the blend a taste and color similar to those of a meat product prepared from meal emulsions;
    (b) shaping the mixture of (a) to a desirable form; and
    (c) heating the shaped mixture to set the gel to a stable physical form,
whereby the heat-set gel resembles a meat product prepared from meat emulsions in appearance, flavor and texture.

2. The method of claim 1 wherein said frozen material is in particulate form.

3. The method of claim 1 wherein said frozen material comprises vegetable oil.

4. The method of claim 1 wherein said frozen material comprises rendered animal fat.

5. The method of claim 1 wherein said vegetable protein comprises a defatted oilseed.

References Cited

UNITED STATES PATENTS

| 2,802,737 | 8/1957 | Anson | 99—14 |
| 2,813,025 | 11/1957 | Anson | 99—14 |

RAYMOND N. JONES, Primary Examiner

R. B. ANDEWELT, Assistant Examiner

U.S. Cl. X.R.

99—109